United States Patent
Ahmed et al.

(10) Patent No.: US 9,386,393 B2
(45) Date of Patent: Jul. 5, 2016

(54) SYSTEM AND METHOD FOR AUTOMATICALLY ACTIVATING A FUNCTION OF A MOBILE DEVICE WITH ANOTHER DEVICE

(71) Applicant: Symbol Technologies, Inc., Schaumburg, IL (US)

(72) Inventors: Khazi-Syed Taheer Ahmed, Hauppauge, NY (US); Eyal Peretz, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 157 days.

(21) Appl. No.: 13/689,161

(22) Filed: Nov. 29, 2012

(65) Prior Publication Data

US 2014/0147122 A1    May 29, 2014

(51) Int. Cl.
| | |
|---|---|
| *H04B 5/00* | (2006.01) |
| *H04W 4/00* | (2009.01) |
| *G08C 23/04* | (2006.01) |
| *H04W 12/04* | (2009.01) |
| *H04W 12/06* | (2009.01) |
| *H04L 29/06* | (2006.01) |
| *H04W 84/12* | (2009.01) |
| *H04W 84/18* | (2009.01) |

(52) U.S. Cl.
CPC .............. *H04W 4/001* (2013.01); *G08C 23/04* (2013.01); *H04W 12/04* (2013.01); *H04W 12/06* (2013.01); *H04L 63/18* (2013.01); *H04W 4/008* (2013.01); *H04W 84/12* (2013.01); *H04W 84/18* (2013.01)

(58) Field of Classification Search
CPC ......................................................... H04B 5/00
USPC ......................................................... 455/41.2
See application file for complete search history.

(56) References Cited

U.S. PATENT DOCUMENTS

| | | | |
|---|---|---|---|
| 5,793,032 A * | 8/1998 | Bard et al. | 235/472.02 |
| 6,783,071 B2 | 8/2004 | Levine et al. | |
| 7,715,793 B2 | 5/2010 | Fuccello et al. | |
| 8,228,198 B2 | 7/2012 | McAllister | |
| 2002/0000470 A1 | 1/2002 | Lanzaro et al. | |
| 2006/0135064 A1 | 6/2006 | Cho | |
| 2007/0206832 A1* | 9/2007 | Gordon | G06T 7/2033 382/103 |
| 2009/0067846 A1 | 3/2009 | Yu et al. | |
| 2009/0286479 A1* | 11/2009 | Thoresson et al. | 455/41.3 |
| 2010/0223461 A1 | 9/2010 | Drader et al. | |
| 2011/0081860 A1* | 4/2011 | Brown et al. | 455/41.3 |
| 2011/0295502 A1 | 12/2011 | Faenger | |
| 2012/0118974 A1* | 5/2012 | Germaine et al. | 235/462.27 |
| 2012/0309313 A1* | 12/2012 | Wang | 455/41.2 |

OTHER PUBLICATIONS

International Search Report and Written Opinion mailed May 14, 2014 in counterpart PCT application No. PCT/US2013/068696.

* cited by examiner

*Primary Examiner* — Ping Hsieh

(57) ABSTRACT

A system for automatically activating a function of a mobile device with a remote device is described. The system includes a first device having an illumination component for generating illumination having a signature. A second mobile device includes a display and a light sensor. A function of the second mobile device is activated in response to the light sensor receiving the illumination having the signature.

17 Claims, 4 Drawing Sheets

SYSTEM AND METHOD FOR AUTOMATICALLY ACTIVATING A FUNCTION OF A MOBILE DEVICE WITH ANOTHER DEVICE

TECHNICAL FIELD

The present disclosure relates generally to systems and methods for activating a function of a mobile device with another device.

BACKGROUND

In conventional systems, a first device can establish a wireless connection with a second device by transmitting a request to connect and executing a connection handshake. For example, according to the Bluetooth® protocol, the first device broadcasts an inquiry. If the second device acknowledges the inquiry, it transmits a response to the first device with its Bluetooth® address. However, the second device may require that the first device be authenticated prior to establishing the connection. An authentication handshake, in addition to the inquiry, prolongs the connection between the first and second devices.

SUMMARY

In one aspect, the invention is embodied in a system for automatically activating a function of a mobile device with a remote device. The system includes a first device having an illumination component for generating illumination having a signature. A second mobile device includes a display and a light sensor. A function of the second mobile device is activated in response to the light sensor receiving the illumination having the signature.

In one embodiment, the display of the second mobile device displays a barcode in response to the light sensor receiving the illumination having the signature. The barcode includes configuration information for configuring the first device to communicate with the second mobile device. In another embodiment, the first device further includes an imaging component that captures the barcode and a processor that decodes the barcode to configure the first device to communicate with the second mobile device. In one embodiment, the first mobile device communicates with the second mobile device over a personal area network. The personal area network can be a Bluetooth, ZigBee, IrDA, or Wireless USB network.

In one embodiment, the illumination component can be a laser. The signature can be a frequency, duration, and/or intensity of a laser scanning beam from the laser. The light sensor can be a photodetector. In one embodiment, the first device includes a wearable scanning device.

In another aspect, the invention is embodied in a mobile device that includes a light sensor for receiving illumination having a signature from an illumination component of a remote device. The mobile device also includes a processor that activates a function of the mobile device in response to the illumination having the signature. In one embodiment, the mobile device also includes a display for displaying data related to the function.

In one embodiment, an imaging component of the remote device captures a barcode displayed on the display and a processor of the remote device decodes the barcode to configure the remote device to communicate with the mobile device. The mobile device can communicate with the remote device over a personal area network.

In one embodiment, the illumination component includes a laser. The signature can include a frequency, duration, and/or intensity of a laser scanning beam generated by the laser. The light sensor can include a photodetector.

In another aspect, the invention is embodied in a method for automatically configuring a first device for communicating with a second mobile device. The method includes illuminating a light sensor of the second mobile device with an illumination component of the first device. The illumination has a signature. The method also includes retrieving a barcode symbol from a memory of the second mobile device in response to receiving the illumination having the signature. The barcode symbol includes configuration information for configuring the first device to communicate with the second mobile device. A display of the second mobile device displays the barcode symbol. An imaging component of the first device captures an image of the barcode symbol displayed on the display. A processor of the first device decodes the barcode symbol. The first device is configured with the configuration information from the decoded barcode symbol to communicate with the second mobile device.

In one embodiment, the first mobile device communicates with the second mobile device over a personal area network. The illumination component can include a laser. The signature can includes a frequency, duration, and/or intensity of a laser scanning beam generated by the laser.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

DETAILED DESCRIPTION

Figure 1:
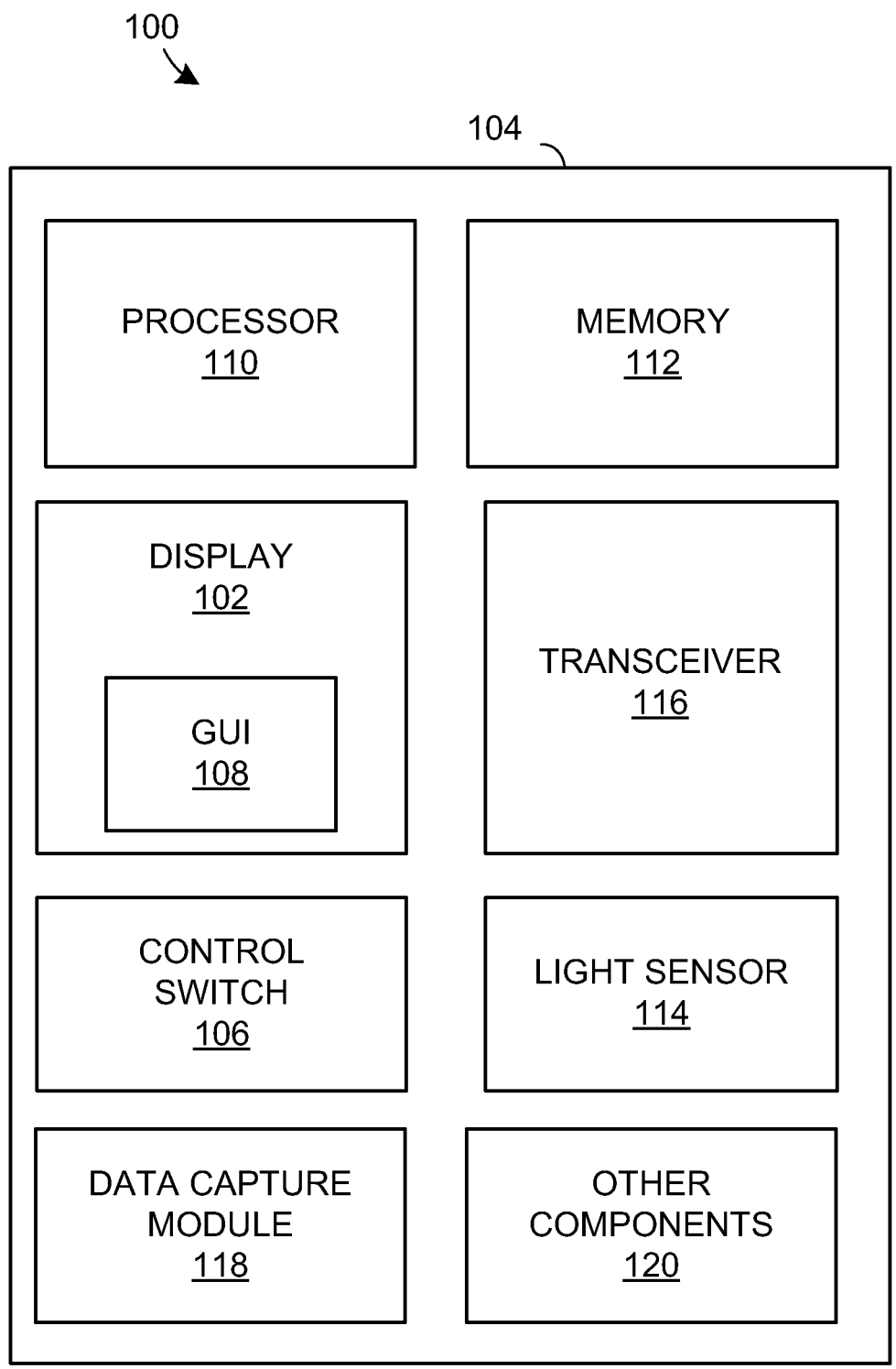
FIG. 1 illustrates a block diagram of the components of a mobile device according to one embodiment of the invention.

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to conventional Bluetooth® communication between devices, need not, and is not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

The present invention describes a system and method for activating a function of a mobile device with another device. A first device includes an illumination component for generating illumination having a signature. A second mobile device includes a display and a light sensor. A function of the second mobile device is activated in response to the light sensor receiving the illumination having the signature.

In one exemplary embodiment, a method according to the invention includes establishing a wireless connection between wireless mobile devices. While the exemplary embodiments of the present invention will be described with reference to the Bluetooth® protocol used for wireless communications by the mobile devices, it should be understood that the present invention may be implemented by any wireless communication mechanism/protocol used by mobile devices, such as, for example, IEEE 802.1x, ZigBee, infrared and wireless USB. In addition, the mobile devices may utilize only the Bluetooth® protocol for wireless communications or utilize the Bluetooth® protocol in conjunction with at least one of the other wireless protocols described herein or known in the art.

More specifically, the system automatically configures a mobile device for communicating with another mobile device. A first mobile device includes an imaging component for capturing an image and an illumination component for illuminating an area in the field of view of the imager. The illumination from the illumination component includes a unique signature. A second mobile device includes a display and a light sensor. The display displays a barcode in response to the light sensor receiving the illumination having the unique signature. The barcode includes configuration information for configuring the first mobile device to communicate with the second mobile device.

Thus, an exemplary embodiment of a system for establishing a wireless connection between mobile devices includes a first mobile device and at least one second mobile device which are each equipped with a radio transceiver configured to conduct wireless communications according to the Bluetooth® protocol. In one embodiment, the second mobile device can be a mobile computing device (e.g., a mobile telephone, personal digital assistant (PDA), tablet computer, a laptop, etc.) which includes an advanced data capture arrangement (e.g., a laser-based scanner, an imager-based scanner, an RFID reader). The second mobile device can also be a mobile computing device, or alternatively can be a peripheral device (e.g., a scanner, a printer, a headset, a keyboard, a pointing device, a digital pen, etc.). A communications network can be established when the second mobile device establishes a wireless connection with the first mobile device. The network can be referred to as a piconet 35, or wireless personal area network (WPAN).

FIG. 1 illustrates a block diagram of the components of a mobile device 100 according to one embodiment of the invention. The mobile device 100 includes a display 102 supported by a housing 104. The display 102 can be a liquid crystal display (LCD) including touch screen capability.

The housing 104 can include one or more control switches 106 for controlling different functions of the mobile device 100. The display 102 can display a graphical user interface 108. The GUI 108 can be programmed to activate different functions of the mobile device 100.

The mobile device 100 can also include a processor 110, a memory 112, a light sensor 114, a transceiver 116, a data capture module 118 and other components 120, such as a battery and a motion sensor, for example. The light sensor 114 can be a photodetector. The light sensor 114 can detect illumination from an external source. For example, the light sensor 114 can detect a laser beam generated by a remote device. For example, the laser beam can be generated by a laser scanning component. In another example, the light sensor 114 can detect illumination having a unique signature from an illumination component of another remote device. The unique signature can include at least one of a frequency and intensity of illumination of the illumination component.

The processor 110 can provide conventional functionalities for the mobile device 100. In a specific example according to the exemplary embodiments of the present invention and as will be described in further detail below, the mobile device 100 can include a plurality of software applications that are executed on the processor 110 such as a software application related to Bluetooth communications. The memory 112 can also provide conventional functionalities for the mobile device 100. For example, the memory 112 can store data and software applications related to operations performed by the processor 110.

In one embodiment, the processor 110 can activate a function of the mobile device 100 in response to data from the light sensor 114 generated by the illumination having the signature from the illumination component of the remote device. For example, activating the function can include rebooting the mobile device 100, hibernating the mobile device 100, activating a data capture function of the mobile device 100, or adjusting a brightness/contrast of the display 102 of the mobile device. In practice, any desired function of the mobile device 100 can be activated. In one embodiment, activating the function can include establishing communications between the mobile device 100 and another device.

The display 102 can be any component configured to display data to a user. The display 102 can include, for example, a liquid crystal display (LCD) at least partially disposed within the housing 104 of the mobile device 100. The display 102 displays the barcode symbol having the configuration information. An imaging component of the other mobile device captures the barcode symbol displayed on the display 102.

The transceiver 116 can provide the mobile device 100 with a method of communicating with the other mobile device and/or with a communications network. The other components 120 can include additional components conventionally found in electronic devices, such as a battery, charging circuitry and one or more antennas, for example.

In one embodiment, the data capture module 118 can include a laser scanner or an imager. The imager can be any component configured to capture image data. For example, the imager can include any type of image sensor or sensors. The imager can capture an image in a field of view (FoV) of the imager. In one embodiment, the image captured in the FoV of the imager can be displayed on the display 102.

As previously described, the display 102 can include a touch screen to enable the user to enter inputs directly on the touch screen. The processor 110 can generate the graphical user interface (GUI) 108 on the display 102 to provide icons corresponding to certain functionality of the mobile device 100.

As previously described, the mobile device 100 includes a light sensor 114 that can detect illumination having a signature from an illumination component of a remote device. In response to the detected illumination, the processor 110 can activate a function of the mobile device 100.

In one example, the function relates to configuring a remote device to communicate with the mobile device 100. In one embodiment, the processor 110 retrieves a barcode symbol from the memory 112 of the mobile device 100 in response to data from the light sensor 114 generated by the illumination having the signature. The barcode symbol contains configuration information, including the Bluetooth address of the mobile device 100, for configuring the remote device to communicate with the mobile device 100. The barcode symbol can be displayed on the display 102 of the mobile device 100.

A Bluetooth-enabled remote device can include an imaging component for capturing an image of the barcode symbol. In one exemplary embodiment, the mobile device 100 displays a unique barcode symbol which includes data identifying the mobile device 100 and, optionally, other information related thereto. For example, when captured by the Bluetooth-enabled remote device, the barcode data is decoded and includes the Bluetooth address of the mobile device 100.

Since the remote device has knowledge of the Bluetooth address of the mobile device 100, the remote device can bypass an inquiry mode and switch directly to a paging mode to establish a wireless connection with the mobile device 100.

Figure 2A:
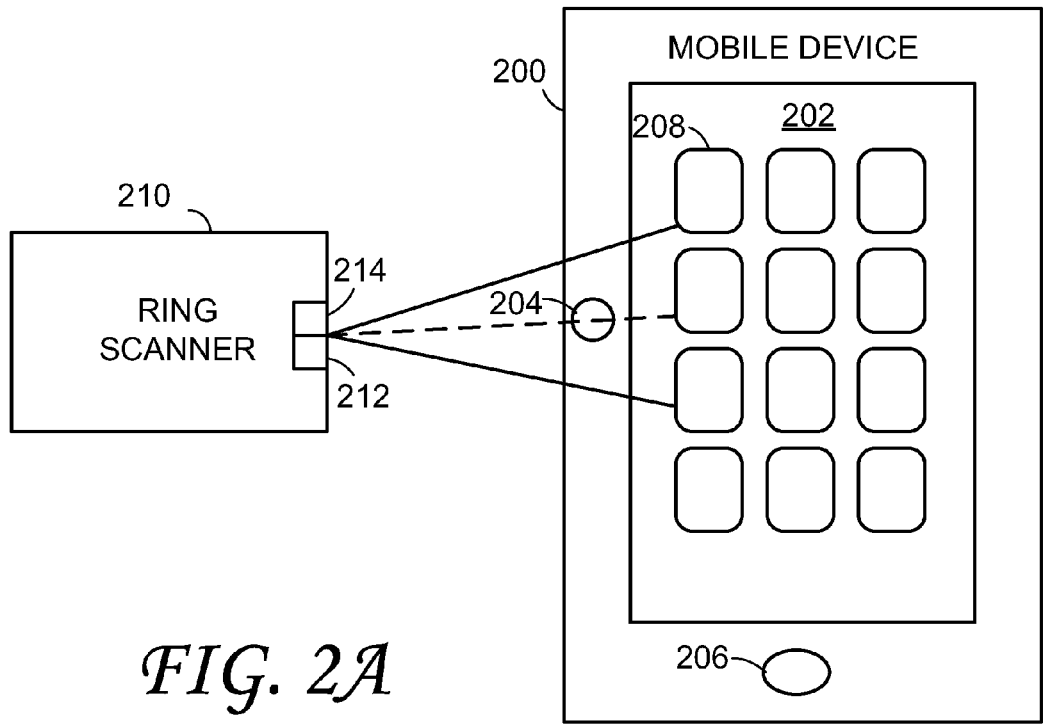
FIG. 2A and FIG. 2B illustrate a mobile device in operation according to one embodiment of the invention.
Figure 2B:
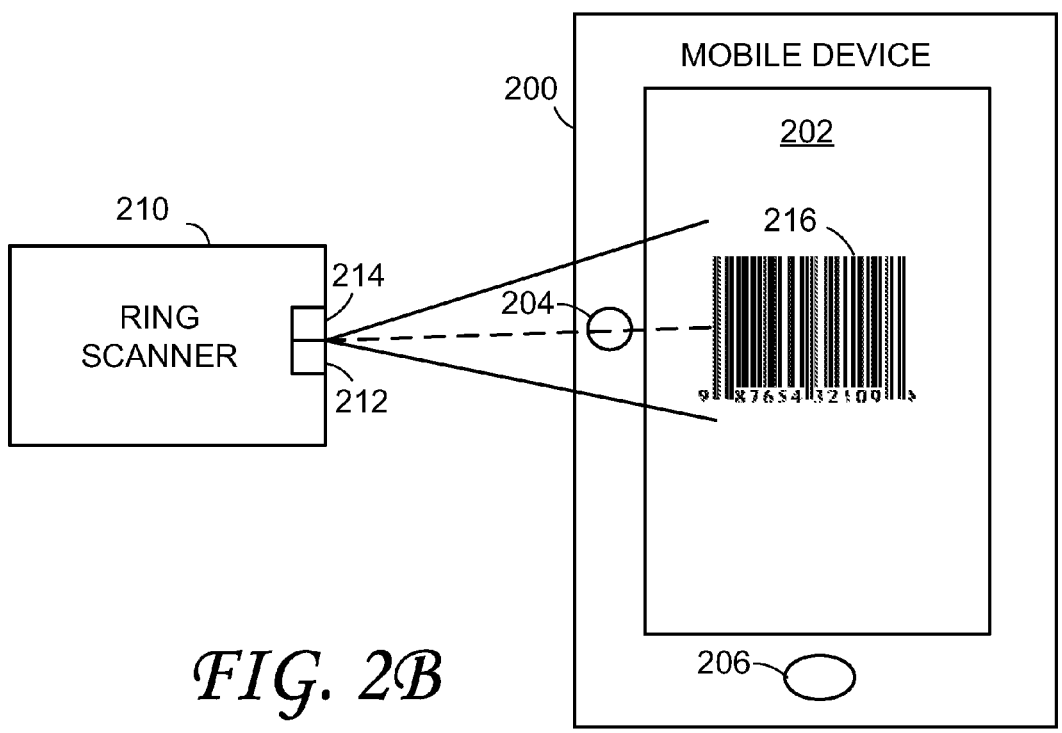

FIG. 2A and FIG. 2B illustrate a mobile device 200 in operation according to one embodiment of the invention. FIG. 2A illustrates the mobile device 200 having a display 202, a light sensor 204, and a control switch 206. The control switch 206 can be used to activate the mobile device 200, for example. The display 202 can display a plurality of icons 208 corresponding to different applications and/or functions of the mobile device 200.

A remote device 210, such as a Bluetooth-enabled ring scanner, can include an imaging component 212 and a corresponding illumination component 214, such as a laser. In operation, the illumination component 214 of the remote device 210 illuminates the light sensor 204 of the mobile device 200. The light sensor 204 generates sensor data that indicates that the remote device 210 is requesting communication with the mobile device 200. In response to the sensor data, the mobile device 200 retrieves a barcode symbol 216 (FIG. 2B) containing configuration information from a memory of the mobile device 200.

The light sensor 204 can be any device that senses light energy, such as a photodetector, a photodiode, a photovoltaic cell, a photoresistor, or a CMOS sensor, for example. In practice, any suitable light sensor can be used. In one embodiment (not shown), a plurality of light sensors 204 can be positioned at various locations around the display 202. In another embodiment, one or more light pipes or optical guides can be used to direct illumination to a light sensor located within the mobile device 200.

In the embodiment shown, the mobile device 200 displays the barcode symbol 216 on the display 202 of the mobile device 200 as shown in FIG. 2B. The imaging component 212 of the remote device 210 can capture an image of the barcode symbol 216. A processor in the remote device 210 can decode the barcode symbol 216 and extract the configuration information, such as the Bluetooth address of the mobile device 200, in order for the remote device 210 to communicate with the mobile device 200.

Figure 3:
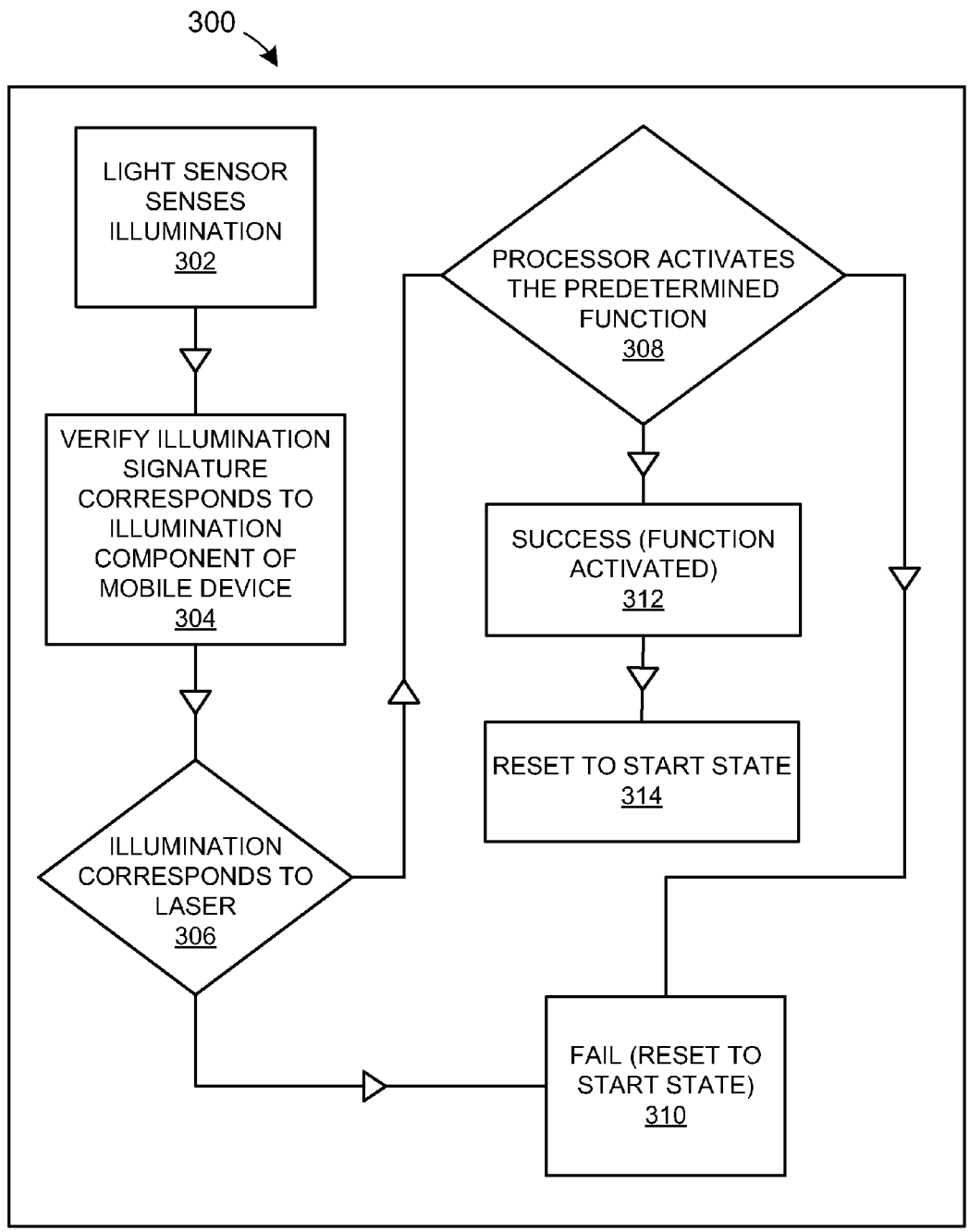
FIG. 3 illustrates an exemplary operation of a light sensor of a mobile device according to the invention.

FIG. 3 illustrates an exemplary operation 300 of a light sensor 204 (FIG. 2A) of a mobile device 200 according to the invention. In step 302, the light sensor 204 of the mobile device 200 senses an illumination from an external source. The processor of the mobile device 200 receives sensor data from the light sensor 204 and determines that the signature of the illumination corresponds to a laser scanning beam from a laser scanning component of a remote device 210 (step 304).

In one embodiment, the illumination includes a laser scanning beam having a predetermined frequency. If the processor of the mobile device 200 determines that the beam corresponds to a laser scanner (step 306), the mobile device 200 establishes that the remote device 210 wishes to activate a function of the mobile device 200 (step 308). If the processor of the mobile device 200 determines that the illumination does not correspond to a previously known illumination component (step 306), the mobile device 200 resets to the initial state (step 310).

When the processor of the mobile device 200 determines that the illumination profile is recognized, the processor activates the predetermined function of the mobile device 200 (step 312). Once the predetermined function is executed, the mobile device 200 resets to the initial state (step 314). If the processor fails to activate the predetermined function, the mobile device 200 returns to the initial state (step 310).

Figure 4:
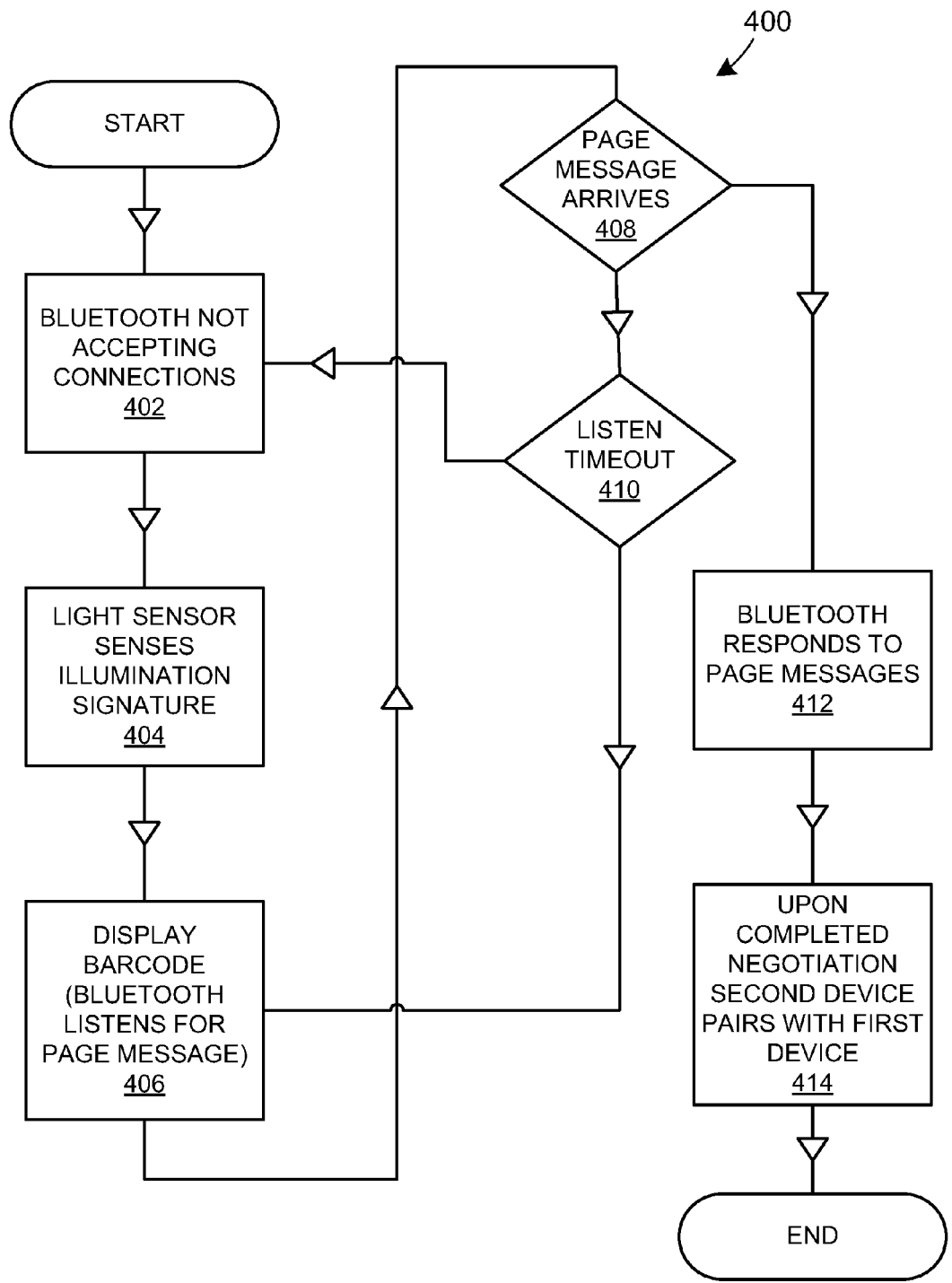
FIG. 4 illustrates an exemplary process for activating a function of a mobile device with a remote device according to the invention.

FIG. 4 illustrates an exemplary process for activating a function of a mobile device 200 with a remote device 210 according to the invention. More specifically, FIG. 4 illustrates one example process 400 of pairing a remote device 210 and a mobile device 200 (FIG. 2A) according to the invention. In a default state 402, the Bluetooth radio of the mobile device 200 is deactivated and does not accept Bluetooth connections. In one embodiment, a control switch 206 or an icon 208 of the mobile device 200 can be used to activate the Bluetooth radio of the mobile device 200. Alternatively, the Bluetooth radio of the mobile device 200 can be automatically activated in response to sensor data received from the light sensor 204 of the mobile device 200.

For example, in step 404, the light sensor 204 of the mobile device 200 senses the illumination signature of the illumination component 214 of the remote device 210. In response to sensing the illumination signature, the processor of the mobile device 200 can optionally activate the Bluetooth radio of the mobile device 200. The processor also retrieves and displays a barcode symbol 216 having the configuration information of the mobile device 200 (step 406). For example, the configuration information can include the Bluetooth address of the mobile device 200.

When the remote device 210 acquires the Bluetooth address of the mobile device 200, it enters the paging mode and transmits a page message with its Bluetooth address to the mobile device 200 (step 408). At this point, the mobile device 200 uses its own FHSS sequence which can differ from the FHSS sequence used by the remote device 210. However, due to the frequency hop rate defined in the Bluetooth protocol, the mobile device 200 will generally "hear" the page message from the remote device 210 on at least one of the frequencies. If the mobile device 200 does not "hear" the page message within a predetermined period of time, the process timeouts (step 410).

Upon hearing the page message, the mobile device 200 transmits a page response including its Bluetooth address (step 412). The remote device 210 can compare the Bluetooth address in the page response to the Bluetooth address in the page message to ensure that the correct mobile device has responded. Upon receipt of the page response, the remote device 210 transmits a synchronization message including synchronization data (e.g., its clock offset and FHSS sequence) to the mobile device 200. The mobile device 200 uses the synchronization data to support the connection with the remote device 210 and transmits a confirmation message (including its Bluetooth address) to the remote device 210. Upon completed negotiation, the remote device 210 successfully pairs with the mobile device 200 (step 414).

In one embodiment, the mobile device 200 can request authentication of the remote device 210 before establishing the connection therewith. In this embodiment, the barcode symbol 216 can further include an authentication code (e.g., a PIN code) required by the mobile device 200 for connecting thereto. The mobile device 200, in the page response for example, transmits a PIN code request to the remote device 210.

Conventionally, a user of the remote device 210 would be required to enter the PIN code manually to complete the authentication. However, according to one embodiment of the present invention, the PIN code is obtained from the scan of the barcode symbol 216 displayed on the mobile device 200, and, as a result, is automatically provided in the synchronization message to the mobile device 200. That is, upon receiving the page response, the remote device 210 can retrieve the PIN code as a function of the Bluetooth address of the mobile device 200. The automatic authentication can further reduce the time it takes to establish the connection between the remote device 210 and the mobile device 200.

In one embodiment, the authentication code can be utilized to encrypt wireless communications between the remote device 210 and the mobile device 200. The authentication code, because it is known by both devices, can be used to generate an encryption key for encrypting (and decrypting on a receiving side) the wireless communications between the devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and apparatus described herein. The non-processor circuits may include, but are not limited to, a radio receiver, a radio transmitter, signal drivers, clock circuits, power source circuits, and user input devices. As such, these functions may be interpreted as steps of a method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A system for automatically activating a function comprising:
    a first device having an illumination component configured to generate illumination having a signature based at least in part on a predetermined intensity of the illumination; and
    a second device having a display and a light sensor, the second device being configured to be conditioned, in response to the light sensor receiving the illumination having the signature with the predetermined intensity of the illumination, from a first state, in which a personal area network (PAN) radio of the second device is deactivated and does not accept PAN connections, to a second state, in which the PAN radio accepts PAN connections and a barcode is retrieved from a memory of the second device to be displayed on the display of the second device,
    wherein,
    (a) the barcode includes a configuration information for configuring the first device to communicate with the second device,
    (b) the first device is configured to capture the barcode and acquire the configuration information from the barcode to initiate paging, synchronization, and authentication between the first device and the second device, and
    (c) the second device is configured to activate the PAN radio in response to receiving sensor data from the light sensor and determine that the signature corresponds to a laser scanning beam of the first device based at least in part on the predetermined intensity.

2. The system of claim 1, wherein the first device further comprises an imaging component that captures the barcode and a processor that decodes the barcode to configure the first device to communicate with the second device.

3. The system of claim 2, wherein the first device communicates with the second device over the personal area network (PAN).

4. The system of claim 3, wherein the personal area network is one of a Bluetooth, ZigBee, IrDA, Wireless USB.

5. The system of claim 1, wherein the illumination component comprises a laser.

6. The system of claim 1, wherein the signature further comprises at least one of a frequency, a duration, and the intensity of the laser scanning beam.

7. The system of claim 1, wherein the light sensor comprises a photodetector.

8. The system of claim 1, wherein the first device comprises a wearable scanning device.

9. A mobile device comprising:
    a light sensor; and
    a processor configured to condition, in response to the light sensor receiving an illumination having a signature based at least in part on a predetermined intensity of the illumination, the mobile device from a first state, in which personal area network (PAN) radio of the mobile device is deactivated and does not accept PAN connections, to a second state, in which the PAN radio accepts PAN connections and a display displays a barcode, wherein the barcode includes a configuration information for configuring a remote device to communicate with the mobile device,
    wherein,
    the processor is further configured to activate the PAN radio in response to receiving sensor data from the light sensor and determine that the signature corresponds to a laser scanning beam of the remote device based at least in part on the predetermined intensity.

10. The mobile device of claim 9, wherein the mobile device communicates with the remote device over the personal area network (PAN).

11. The mobile device of claim 9, wherein the illumination component comprises a laser.

12. The mobile device of claim 9, wherein the signature further comprises at least one of a frequency, a duration, and the intensity of the laser scanning beam.

13. The mobile device of claim 9, wherein the light sensor comprises a photodetector.

14. A method for automatically configuring a first device for communicating with a second device, the method comprising:
    receiving, from the first device by a light sensor of the second device, an illumination having a signature based at least in part on a predetermined intensity of the illumination and, in response:
        conditioning, by a processor of the second device, a personal area network (PAN) radio of the second device from a first state, in which the PAN radio does not accept PAN connections, to a second state, in which the PAN radio accepts connections, wherein the processor activates the PAN radio in response to receiving sensor data from the light sensor and determines that the signature corresponds to a laser scanning beam of the first device based at least in part on the predetermined intensity;
    retrieving a barcode symbol from a memory of the second device, the barcode symbol including configuration information for configuring the first device to communicate with the second device; and
    rendering the barcode symbol on a display of the second device.

15. The method of claim 14, wherein the first device communicates with the second device over the personal area network (PAN).

16. The method of claim 14, wherein the illumination comprises a laser scanning beam.

17. The method of claim 14, wherein the signature further comprises at least one of a frequency and the intensity of the laser scanning beam.

* * * * *